(12) United States Patent
Sakuma et al.

(10) Patent No.: US 7,851,084 B2
(45) Date of Patent: Dec. 14, 2010

(54) VINYLIDENE FLUORIDE BASED CORE-SHELL TYPE POLYMER AND USE THEREOF IN NONAQUEOUS ELECTROCHEMICAL DEVICE

(75) Inventors: Mitsuyasu Sakuma, Fukushima-Ken (JP); Tamito Igarashi, Fukushima-Ken (JP); Aisaku Nagai, Tokyo (JP); Nobuo Ahiko, Fukushima-Ken (JP); Mayumi Sugahara, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 680 days.

(21) Appl. No.: 11/795,595

(22) PCT Filed: Jan. 20, 2006

(86) PCT No.: PCT/JP2006/300891
§ 371 (c)(1),
(2), (4) Date: Jul. 19, 2007

(87) PCT Pub. No.: WO2006/080259
PCT Pub. Date: Aug. 3, 2006

(65) Prior Publication Data
US 2008/0131776 A1 Jun. 5, 2008

(30) Foreign Application Priority Data
Jan. 27, 2005 (JP) ............................. 2005-019960

(51) Int. Cl.
*H01M 4/60* (2006.01)
(52) U.S. Cl. .................. 429/217; 428/402.21; 428/403; 428/421; 525/199
(58) Field of Classification Search ................ 429/217; 525/199; 428/402.21, 403, 421
See application file for complete search history.

(56) References Cited

U.S. PATENT DOCUMENTS

| 4,469,846 | A |   | 9/1984  | Khan et al.          |         |
|-----------|---|---|---------|----------------------|---------|
| 5,587,424 | A | * | 12/1996 | Langstein et al.     | 525/63  |
| 5,707,763 | A | * | 1/1998  | Shimizu et al.       | 429/217 |
| 5,898,042 | A | * | 4/1999  | Sawada et al.        | 523/201 |
| 6,596,810 | B1| * | 7/2003  | Hatke et al.         | 525/63  |
| 7,071,273 | B2| * | 7/2006  | Kobayashi et al.     | 526/247 |

FOREIGN PATENT DOCUMENTS

| JP | 59-232109 |   | 12/1984 |
|----|-----------|---|---------|
| JP | 03-166231 | * | 7/1991  |

(Continued)

*Primary Examiner*—Peter D. Mulcahy
*Assistant Examiner*—Henry Hu
(74) *Attorney, Agent, or Firm*—Wenderoth, Lind & Ponack, L.L.P.

(57) ABSTRACT

A core/shell polymer (A), comprising: a rubbery core comprising a crosslinked vinylidene fluoride copolymer (a) having a vinylidene fluoride content of 30-90 wt. % and a shell comprising a vinylidene fluoride polymer (b) having a vinylidene fluoride content which is larger than in the crosslinked vinylidene fluoride copolymer (a) and at least 80 wt. %, in a weight ratio (a)/(b) of 30/70-90/10. The vinylidene fluoride-based core/shell polymer (A) is excellent in mechanical properties including flexibility and resistance to nonaqueous electrolytic solutions, is capable of forming a composite electrode layer showing excellent flexibility and adhesion to an electroconductive substrate in combination with a powder active substance and is therefore suitable for use as a binder for nonaqueous electrochemical devices.

5 Claims, 1 Drawing Sheet

FOREIGN PATENT DOCUMENTS

| | | | |
|---|---|---|---|
| JP | 04-164907 | | 6/1992 |
| JP | 06-073137 | * | 3/1994 |
| JP | 11-080296 | * | 3/1999 |
| JP | 11-246639 | | 9/1999 |
| JP | 2000-200616 | | 7/2000 |
| JP | 2004-534892 | | 11/2004 |
| WO | WO-2006/080259 A1 | * | 8/2006 |

* cited by examiner

VINYLIDENE FLUORIDE BASED CORE-SHELL TYPE POLYMER AND USE THEREOF IN NONAQUEOUS ELECTROCHEMICAL DEVICE

TECHNICAL FIELD

The present invention relates to a novel vinylidene fluoride-based core/shell polymer and use thereof in nonaqueous electrochemical devices, i.e., a binder composition for non-aqueous electrochemical devices, an electrode-forming composition and a nonaqueous electrochemical device, containing the core/shell polymer.

BACKGROUND ART

In order to increase the capacity of nonaqueous electrochemical devices, such as lithium ion secondary batteries and electric double layer capacitors, it has been studied to increase the density of the electrodes and increase the amount of active substance per volume thereof. As a binder for electrode substances, a vinylidene fluoride resin has been principally used. In the preparation of an electrode by packing an electrode sheet formed by applying and drying an electrode-forming composition on a metal foil (electroconductive substrate), however, the resultant composite electrode layer is liable to be cracked to separate from the electroconductive substrate or the electroconductive substrate per se is liable to be broken, e.g., when the electrode sheet is wound about an axis at a short curvature radius in the case of a cylindrical battery or the electrode sheet is bent in the case of a rectangular battery.

In some cases, a rubbery polymer such as styrene-butadiene rubber is used as a binder for the purpose of providing a composite electrode layer with flexibility, it is difficult to increase the density because of rubber elasticity when the composite electrode layer is pressed. As for fluorine-containing resins, a soft binder can be provided if vinylidene fluoride-chlorotrifluoroethylene (CTFE) copolymer or vinylidene fluoride-hexafluoropropylene (HFP) copolymer is used to lower the crystallinity of vinylidene fluoride, but it is known that the composite electrode layer is swollen or dissolved with an electrolytic solution in case of an increased CTFE or HFP content.

Use of a rubber-type binder has been proposed (Patent document 1 listed below), but when it is used alone in preparation of electrodes, the powdery active substance is liable to be set in separation in the electrode-forming slurry so that the formation of a stable composite electrode layer becomes difficult. It has been also proposed to blend a vinylidene fluoride resin with a rubbery polymer (Patent document 2 below), but when they are dissolved in an organic solvent such as N-methyl-2-pyrrolidone (NMP) to form a binder, they are liable to cause phase separation in the binder solution, and when the binder solution is further blended with an electrode material such as an active substance to form an electrode-forming slurry, the active substance and the solution components are liable to separate from each other so that the formation of a uniform electrode by application becomes difficult.

While the use of a core/shell-type binder has been proposed (Patent document 3 below), the core formed of PTFE has a high elasticity modulus, so that the formation of a flexible electrode is impossible.

Patent document 1: WO 98/39808A
Patent document 2: JP 09-21337A
Patent document 3: WO 96/12784A

DISCLOSURE OF INVENTION

A principal object of the present invention is to provide a vinylidene fluoride-based core/shell polymer, which is excellent in mechanical properties including flexibility and resistance to nonaqueous electrolytic solutions, is capable of forming a composite electrode layer showing excellent flexibility and adhesion to an electroconductive substrate in combination with a powdery active substance and is therefore suitable for use as a binder for nonaqueous electrochemical devices.

Another object of the present invention is to provide a binder composition for nonaqueous electrochemical devices, an electrode-forming composition, an electrode and a non-aqueous electrochemical device containing the above core/shell polymer.

The core/shell polymer (A) of the present invention has been developed to achieve the above-mentioned objects and, more specifically, comprises: a rubbery core comprising a crosslinked vinylidene fluoride copolymer (a) having a vinylidene fluoride content of 30-90 wt. % and a shell comprising a vinylidene fluoride polymer (b) having a vinylidene fluoride content which is larger than in the crosslinked vinylidene fluoride copolymer (a) and at least 80 wt. %, in a weight ratio (a)/(b) of 30/70-90/10. When the core/shell polymer of the present invention is used as a binder for nonaqueous electrochemical devices, the rubbery core comprising the crosslinked vinylidene fluoride copolymer (a) is used to impart flexibility to the composite electrode layer without remarkably impairing the resistance to nonaqueous electrolytic solutions. On the other hand, the shell comprising the vinylidene fluoride polymer (b) effectively functions to reinforce the resistance to nonaqueous electrolytic solutions which is insufficient by the core alone by coating the core with a layer thereof and to provide the slurry-form binder composition with an appropriate viscosity, thereby preventing the separation by setting of the powdery active substance to allow the formation of a uniform slurry of electrode-forming composition.

The present invention further provides a binder composition for nonaqueous electrochemical devices comprising the above-mentioned core/shell polymer (A). According to necessity, it is possible to add a second vinylidene fluoride polymer (C) having a similar composition as the vinylidene fluoride polymer (b) as a sub-binder component.

The present invention further provides an electrode-forming composition for nonaqueous electrochemical devices comprising a powdery active substance capable of occluding and liberating lithium ions and the above-mentioned binder composition; a slurry-form electrode-forming composition formed by dispersing the above-mentioned electrode-forming composition in an organic solvent; an electrode comprising a layer of the above-mentioned electrode-forming composition on an electroconductive substrate; and further a nonaqueous electrochemical device comprising the electrode as at least one of a positive electrode and a negative electrode.

BEST MODE FOR PRACTICING THE INVENTION

Hereinbelow, the present invention will be described in order with respect to preferred embodiments thereof.

(Core/Shell Polymer (A))

The core/shell polymer (A) of the present invention comprises: a rubbery core comprising a crosslinked vinylidene fluoride copolymer (a) having a vinylidene fluoride content of 30-90 wt. %, and a shell comprising a vinylidene fluoride polymer (b) having a vinylidene fluoride content which is larger than in the crosslinked vinylidene fluoride copolymer (a) and at least 80 wt. %, in a weight ratio (a)/(b) of 30/70-90/10.

The content of vinylidene fluoride units in the crosslinked vinylidene fluoride copolymer (a) forming the core is at least 30 wt. %, preferably at least 40 wt. %, further preferably at least 50 wt. %, and at most 90 wt. %, preferably at most 80 wt. %, further preferably at most 70 wt. %. Outside the compositional ranges, the core is liable to have a high storage modulus, thus resulting in inferior flexibility of the vinylidene fluoride copolymer (a).

Examples of comonomer for providing the vinylidene fluoride copolymer (a) together with vinylidene fluoride may include: hydrocarbon monomers, such as ethylene and propylene; and fluorine-containing monomers, such as vinyl fluoride, chlorotrifluoroethylene, trifluoroethylene, tetrafluoroethylene, hexafluoroethylene, hexafluoropropylene and fluoroalkyl vinyl ethers.

The copolymer (a) is crosslinked with a crosslinking monomer (crosslinking agent) having at least two double bonds. The crosslinking agent may occupy 0.01-5 wt. %, preferably 0.05-3 wt. %, further preferably 0.1-2 wt. %, of the total vinylidene fluoride copolymer.

As the crosslinking agent, it is also possible to use known compounds inclusive of: (poly)alkylene glycol dimethacrylate esters, such as ethylene glycol dimethacrylate, 1,3-butylene glycol dimethacrylate, 1,4-butylene glycol dimethacrylate, propylene glycol dimethacrylate and diethylene glycol dimethacrylate; (poly)alkylene glycol diacrylate esters, such as ethylene glycol diacrylate, 1,3-buthylene glycol diacrylate, 1,4-buthylene glycol diacrylate, propylene glycol diacrylate and diethylene glycol diacrylate; polyvinylbenzenes, such as divinylbenzene and trivinylbenzene; and triallyl cyanurate, triallyl isocyanurate. However, fluorine-containing crosslinking monomers, e.g., represented by a formula of:

$$CF_2=CFO-Rf_1-OCF=CF_2, \text{ or}$$

$$CF_2=CFO-Rf_2-CF=CF_2,$$

(wherein $Rf_1$ denotes a fluoroalkylene group having 1-8 carbon atoms and capable of including an ether-forming oxygen atom, and $Rf_2$ denotes a single bond or a fluoroalkylene group having 1-8 carbon atoms and capable of including an ether-forming oxygen atom), are preferred because of excellent reactivity with fluorine-containing monomers, such as vinylidene fluoride, tetrafluoroethylene, chlorotrifluoroethylene, hexafluoroethylene, hexafluoropropylene and fluoroalkyl vinyl ethers. Among these, perfluorodivinyl ethers are preferred, and examples thereof may include the following:

$$CF_2=CFOCF=CF_2,$$

$$CF_2=CFOCF_2OCF=CF_2,$$

$$CF_2=CFO(CF_2)_2OCF=CF_2,$$

$$CF_2=CFO(CF_2)_3OCF=CF_2,$$

$$CF_2=CFO(CF_2)_4OCF=CF_2,$$

$$CF_2=CFO(CF_2)_5OCF=CF_2,$$

$$CF_2=CFO(CF_2)_6OCF=CF_2,$$

$$CF_2=CFOCF_2OCF(CF_3)CF_2OCF=CF_2,$$

$$CF_2=CFO(CF_2)_2OCF(CF_3)CF_2OCF=CF_2,$$

$$CF_2=CFO(CF_2)_3OCF(CF_3)CF_2OCF=CF_2,$$

$$CF_2=CFOCF_2CF(CF_3)O(CF_2)_2OCF(CF_3)CF_2OCF=CF_2,$$

$$CF_2=CFOCF_2CF(CF_3)O(CF_2)_3OCF(CF_3)CF_2OCF=CF_2,$$

$$CF_2=CFOCF_2CF=CF_2,$$

$$CF_2=CFO(CF_2)_2CF=CF_2, \text{ and}$$

$$CF_2=CFO(CF_2)_3CF=CF_2.$$

The thus-obtained crosslinked vinylidene fluoride copolymer (a) may preferably have a storage modulus of at most 500 MPa, particularly at most 300 MPa. If the storage modulus exceeds 500 MPa, it becomes difficult to form a composite electrode layer having desirable flexibility.

The vinylidene fluoride polymer (b) forming a shell coating the crosslinked vinylidene fluoride copolymer (a) in a layer is vinylidene fluoride homopolymer or a vinylidene fluoride copolymer having a vinylidene fluoride content which is at least 80 wt.% and larger than in the crosslinked vinylidene fluoride copolymer (a). The vinylidene fluoride content in the vinylidene fluoride polymer (b) is preferably at least 90 wt.%, more preferably at least 95 wt.%. If the vinylidene fluoride content is below 80 wt.%, the vinylidene fluoride polymer is liable to have a lower crystallinity, thus making it difficult to form a composite electrode layer resistant to nonaqueous electrolytic solutions. Further, if the vinylidene fluoride content is not larger than in the vinylidene fluoride copolymer (a), the effect of forming a shell of the vinylidene fluoride polymer (b) to improve the resistance to nonaqueous electrolytic solutions becomes scarce. The difference is preferably at least 10 wt.%. Examples of monomers copolymerized with vinylidene fluoride may include: hydrocarbon monomers, such as ethylene and propylene; and fluorine-containing monomers, such as vinyl fluoride, chlorotrifluoroethylene, trifluoroethylene, tetrafluoroethylene, hexafluoropropylene and fluoroalkyl vinyl ethers.

The shell-forming vinylidene fluoride polymer (b) is believed to form an interpenetrating network structure with the core-forming crosslinked vinylidene fluoride copolymer (a) due to penetration of the monomer (composition) thereof into the surface of the latter at the time of polymerization, so that it prevents the exposure of the core to some extent even without crosslinking to exhibit an effect of improving the resistance to nonaqueous electrolytic solutions. However, if the shell-forming vinylidene fluoride polymer (b) is provided with a crosslinking structure by using a crosslinking agent at the time of polymerization thereof, a further improvement in resistance to electroconductive substrate can be attained, so that it is also preferred that the vinylidene fluoride polymer (b) is also crosslinked similarly as the vinylidene fluoride copolymer (a). The crosslinking agent and the amount thereof may be similar to those in the case of the vinylidene fluoride copolymer (a).

The weight ratio (a)/(b) between the core of the vinylidene fluoride copolymer (a) and the shell of the vinylidene fluoride polymer (b) forming the core/shell polymer (A) is 30/70-90/10, preferably 35/65-80/20, more preferably 40/60-70/30. If (a)/(b) is below 30/70, the core/shell polymer (A) is caused to have a high storage modulus and become less flexible. If (a)/(b) exceeds 50/50, the core/shell polymer (A) is caused to have somewhat lower resistance to nonaqueous electrolytic solutions. More specifically, in a composite electrode layer formed by using the core/shell polymer (A) alone as a binder, the protection effect given by the shell (b) is lowered, and the exposed core is liable to be attacked with the nonaqueous electrolytic solution to cause decomposition or swelling of the binder, thereby impairing the integrity of the composite electrode layer. However, unless the ratio (a)/(b) is excessively large, the resistance to nonaqueous electrolytic solutions can be improved to prevent the collapse of the composite electrode layer by co-using a second binder comprising a vinylidene fluoride polymer (C) described later. In case where (a)/(b) exceeds 90/10, it becomes difficult to exhibit a binder function of preventing the collapse of the composite electrode layer even by co-using the vinylidene fluoride polymer (C).

The core/shell polymer (A) may be produced through successive polymerization according to any arbitrary polymerization scheme, such as emulsion polymerization, suspension polymerization, solution polymerization or bulk polymerization, but emulsion polymerization is preferred from a viewpoint of texture control. As a catalyst for the emulsion polymerization, it is possible to use a water-soluble inorganic peroxide, such as potassium persulfate or ammonium persulfate, alone or in combination with a reducing agent to form a redox system. As an emulsifier, it is possible to use ammonium perfluorooctanoate, ammonium perfluoroheptanoate, ammonium perfluorononanoate, or a mixture of these, but ammonium perfluorooctanoate may preferably be used. In general, the pressure (gauge pressure) in the polymerization system may be ca. 0-10 MPa, preferably ca. 1-8 MPa, further preferably 1-5 MPa. The polymerization may be performed at a temperature condition of 0-100° C., preferably 20-90° C., further preferably 40-80° C. For the purpose of controlling pH in the polymerization system, it is possible to add an electrolyte having a buffer function, such as $Na_2HPO_4$, $NaH_2PO_4$ or $KH_2PO_4$, or sodium hydroxide.

Through the emulsion polymerization, the core/shell polymer (A) may be provided with a particle size of 0.01 µm-10 µm, preferably 0.05 µm-1 µm, more preferably 0.05 µm-0.5 µm.

If smaller than the above range, the amount of the emulsifier may be increased to result in an increase in the production cost, and if larger than the above range, the latex is liable to be unstabilized to result in inferior productivity. For use as a binder, if larger than the above range, the dispersion size in the electrode becomes large to result in inferior binder function.

The vinylidene fluoride polymer (C) may be used according to necessity for the purpose of, e.g., for improving the resistance to nonaqueous electrolytic solutions of the binder composition in the case of using a core/shell polymer (A) having an (a)/(b) weight ratio of 50/50or larger as a binder, preventing the separation by setting of the powdery active substance by adjusting the viscosity of the electrode-forming slurry composition, or increasing the adhesion of the composite electrode layer onto the electroconductive substrate, and may comprise vinylidene fluoride homopolymer or a copolymer principally comprising vinylidene fluoride. The copolymer may preferably be a vinylidene fluoride copolymer obtained by copolymerizing vinylidene fluoride, with one or more species selected from hydrocarbon monomers, such as ethylene and propylene; or fluorine-containing monomers other than vinylidene fluoride, such as vinyl fluoride, chlorotrifluoroethylene, trifluoroethylene, tetrafluoroethylene, hexafluoropropylene and fluoroalkyl vinyl ethers.

Further, it is also possible to preferably use a functional group-containing vinylidene fluoride polymer (C) formed by copolymerizing 0.1-3 wt. parts with respect to 100 wt. parts in total with the above-mentioned monomers of at least one functional group-containing monomer, selected from carboxyl group-containing monomers, inclusive of unsaturated monobasic acids, such as acrylic acid and crotonic acid, unsaturated dibasic acids, such as maleic acid and citraconic acid, or monoalkyl esters thereof, such as monomethyl maleate, monoethyl maleate, monomethyl citraconate and monoethyl citraconate; and glycidyl group-containing monomers, such as allyl glycidyl ether, methallyl glycidyl ether, glycidyl crotonate, and glycidyl allylacetate, for the purpose of increasing the adhesion with the electroconductive substrate.

Such a vinylidene fluoride polymer (C) may be obtained through a known process, such as suspension polymerization, emulsion polymerization or solution polymerization.

The vinylidene fluoride polymer (C) may have an inherent viscosity (in terms of a logarithmic viscosity at 30° C. of a solution formed by 4 g of a resin dissolved in 1 liter of N,N-dimethylformamide) of 0.8-10 dl/g, preferably 1.0-5 dl/g, further preferably 1.1-3.5 dl/g, as a measure of molecular weight thereof. If the inherent viscosity of the vinylidene fluoride polymer is below the above-mentioned range, the electrode-forming composition is caused to have a low viscosity so that the application thereof becomes difficult. Above the above-mentioned range, the dissolution thereof in an organic solvent becomes difficult, so that an inherent viscosity outside the above-mentioned range is inappropriate.

In the case of using the vinylidene fluoride polymer (C) as a sub-binder component in combination with a core/shell polymer (A) having a core (a)/shell (b) weight ratio in excess of 50/50 and showing inferior resistance to nonaqueous electrolytic solutions, the amount of addition thereof may be at least 10 wt. %, preferably at least 20 wt. %, further preferably 30 wt. % or more with respect to a total thereof with the core/shell polymer (A).

Further, while the vinylidene fluoride polymer (C) can also be used as a sub-binder component for the purpose of preventing separation due to setting of the powdery active substance by adjusting the viscosity of the electrode-forming slurry and increasing the adhesion of the composite electrode layer to the electroconductive substrate, the weight fraction thereof in the binder composition in this case may preferably be at least 10% and at most 70%, more preferably 20-60%, further preferably 30-50%. In excess of 70%, the binder composition fails to exhibit sufficient flexibility.

Thus, the binder composition for nonaqueous electrochemical devices according to the present invention may be formed of the above-mentioned core/shell polymer (A) alone or as a mixture with the vinylidene fluoride polymer (C) as an optional sub-binder component, so as to exhibit appropriate levels of swellability and gel fraction as measured according to methods described hereinafter. That is, a swellability of below 50 wt. % when immersed in a nonaqueous electrolytic solution at 60° C., and a gel fraction (insoluble fraction) in the nonaqueous electrolytic solution of at least 85%, preferably at least 95%.

The binder composition of the present invention can also be used in such a manner as to be powder-blended with a powdery active substance (powdery electrode material) described hereinafter, followed by melt-forming or powder forming, to form a composite electrode layer on an electroconductive substrate. It is, however, preferred to take advantage of its partial solubility or swellability thereof within an organic solvent by mixing it with an organic solvent and a powdery active substance to form an appropriate viscosity of electrode-forming slurry, so as to exhibit a binder effect at as small an amount as possible with respect to the powdery active substance, thereby preventing an increase of internal resistance in the composite electrode layer.

The organic solvent used for forming an electrode-forming composition is preferably a polar one, and examples thereof may include: N-methyl-2-pyrrolidone, N,N-dimethylformamide, N,N-dimethylacetamide, dimethyl sulfoxide, hexamethylphosphoamide, dioxane, tetrahydrofuran, tetramethylurea, triethyl phosphate, and trimethyl phosphate. Among the above organic solvents, it is preferred to use a nitrogen-containing organic solvent, such as N-methyl-2-pyrrolidone, N,N-dimethylformamide or N,N-diethylacetamide. These organic solvents may be used singly or in mixture of two or more species.

In forming an electrode-forming slurry, such an organic solvent may be used in 100 wt. parts together with the above-mentioned core/shell polymer (A) alone or in combination with the optionally used vinylidene fluoride polymer (C) in a total amount of preferably 0.1-20 wt. parts, further preferably 0.5-15 wt. parts, particularly 1-10 wt. parts, for partial dissolution or dispersion. Below 0.1 wt. part, the fraction of the polymer in the slurry is too small so that it becomes impossible to exhibit the effect of a binder for mutually binding the powdery electrode material. On the other hand, in excess of 20 wt. parts, the slurry is caused to have a high viscosity so that it becomes difficult to form the electrode-forming composition in some cases.

The electrode-forming composition of the present invention may be applicable to any of positive and negative electrode-forming compositions of a non-aqueous battery and a polarizable electrode-forming composition of an electric double layer capacitor.

To a mixture liquid of the binder composition of the present invention and an organic solvent, powdery electrode materials (electrode active substances for nonaqueous batteries or a polarizable electrode-forming powdery carbon material, and optionally added electroconductive aid and other additives) may be added for dispersion and mixing to obtain an electrode-forming slurry.

As for the active substances for lithium secondary batteries, in the case of a positive electrode, it is preferred to use a composite metal chalcogenide represented by a general formula of $LiMY_2$, wherein M denotes at least one species of transition metals, such as Co, Ni, Fe, Mn, Cr and V; Y denotes a chalcogen such as O or S; particularly complex metal oxides inclusive of those represented by $LiNi_xCo_{1-x}O_2$ ($0 \leq x \leq 1$) or a complex metal oxide assuming a spinel structure such as $LiMnO_2$. In the case of a negative electrode, it is possible to use a powdery carbonaceous material; such as graphite, activated carbon, or a calcination and carbonization product of phenolic resin or pitch, etc.; or alternatively a metal oxide of GeO, $GeO_2$, SnO, $SnO_2$, PbO, $PbO_2$, etc., or a complex metal oxide of these (e.g., those disclosed in JP 07-249409A), or an alloy-forming negative electrode material comprising at least one species of single substances of elements capable of forming alloys with light metals of lithium (Li), etc., and compounds or alloys thereof. Single substance elements may include, e.g., Mg, B, Al, Ga, In, Si, Ge, Sn, Pb, Sb, Bi, Cd, Ag, Zn, Hf, Zr, Y, etc., among which Si, Ge, Sn or Pb is preferred. Further, as alloys, Si—Sn, Fe—Sn, Co—Sn, Cu—Si, etc., are preferred.

As for the powdery carbonaceous materials for constituting electrode-forming compositions for formation of polarizable electrodes of electric double layer capacitors, those having a specific surface area of 500-3000 $m^2/g$ are suitably used. Specific examples thereof may include; coconut shell-based activated carbon, phenol-based activated carbon, petroleum coke or pitch-based activated carbon, polyvinylidene chloride-based activated carbon, and polyacene.

An electroconductive aid may be added as desired in the case of using an active substance having little electron-conductivity such as $LiCoO_2$ in batteries, or for the purpose of improving the conductivity of a composite electrode layer in electric double layer capacitors. A carbonaceous material, such as carbon black, graphite fine powder or fibrous material, or fine powder or fiber of metal, such as nickel or aluminum, may be used.

The binder composition (the core/shell polymer (A) alone or a mixture thereof with the vinylidene fluoride polymer (C)) may preferably be used in an amount of 0.1-50 wt. parts, particularly 1-20 wt. parts, as polymer solid, with 100 wt. parts of such a powdery electrode material to provide an electrode-forming composition.

Figure 1:
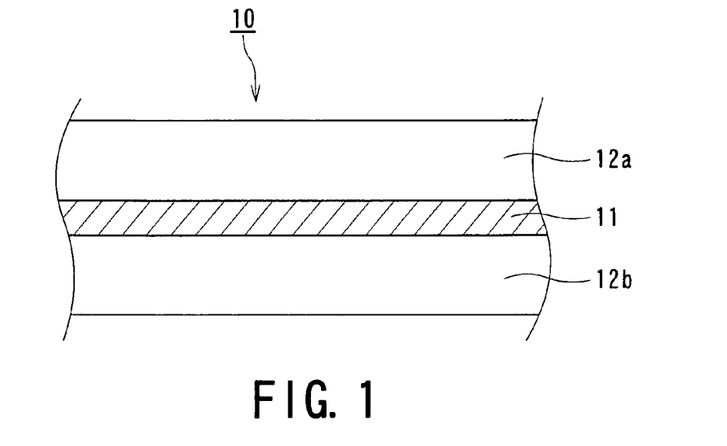
FIG. 1 is a partial sectional view of an electrode structure adopted in a non-aqueous-type battery.

The thus-obtained electrode-forming composition (slurry) may be applied, as shown in a sectional view of FIG. 1, onto at least one surface, preferably both surfaces, of an electroconductive substrate 11 comprising a metal foil or metal net of iron, stainless steel, steel, copper, aluminum, nickel, titanium, etc., and having a thickness of 5-100 μm, or, e.g., 5-20 μm in a small-scale device, and dried at, e.g., 50-170° C. to form composite electrode layers 12a and 2b of, e.g., 10-1000 μm in thickness, thereby providing an electrode 10 for nonaqueous batteries.

Figure 2:
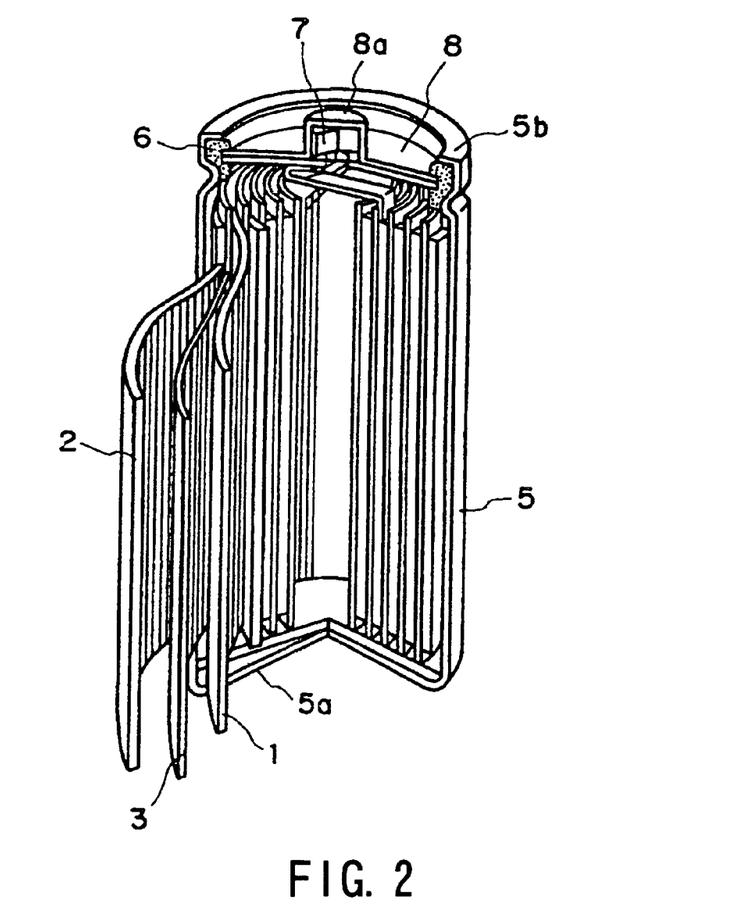
FIG. 2 is a partially exploded perspective view of a non-aqueous solvent-type secondary battery, which can be formed according to the present invention.

FIG. 2 is a partially exploded perspective view of a lithium secondary battery as an embodiment of the nonaqueous electrochemical device according to the present invention, including an electrode structure prepared in the above-described manner.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polypropylene or polyethylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode 1. Further, the uppermost rim 5b of the casing 5 is crimped toward the inner side to form an entirely sealed cell structure enclosing the electricity-generating element. The positive electrode 1 and/or the negative electrode 2 may have a structure of the electrode structure 10, e.g., as shown in FIG. 1.

The non-aqueous electrolyte solution impregnating the separator 3 may comprise a solution of an electrolyte, such as a lithium salt, in a non-aqueous solvent (organic solvent).

Examples of the electrolyte may include: $LiPF_6$, $LiAsF_6$, $LiClO_4$, $LiBF_4$, $CH_3SO_3Li$, $CF_3SO_3Li$, $LiN(SO_2CF_3)_2$, LiCl, and LiBr. Examples of the organic solvent for such an electrolyte may include: propylene carbonate, ethylene carbonate, 1,2-dimethoxyethane, 1,2-diethoxy-ethane, dimethyl carbonate, diethyl carbonate, methyl ethyl carbonate, γ-butyrolactone, methyl propionate, ethyl propionate, and mixtures of these, but they are not exhaustive.

In the above, a cylindrical battery has been described as an embodiment. However, the non-aqueous-type battery according to the present invention can basically have any other shapes, such as those of a coin, a prismatic, or a paper or sheet.

EXAMPLES

Hereinbelow, the present invention will be described more specifically based on polymer production examples, examples and comparative examples for use as binders. Incidentally, "parts" and "%" used for describing compositions or ratios are by weight unless otherwise noted specifically.

Characteristic values described herein including the following description are based on values measured according to the following methods.

(Measurement of Latex Particle Size)

Particle size (diameter) of polymer in a latex prepared by emulsion polymerization was measured by a particle size distribution meter ("N4 PLUS", made by Beckman Coulter Co.). The measurement was performed according to the photon correlation method to obtain a particle size distribution according to a single dispersion mode at a scattering angle of 90 degrees and to obtain a particle size averaged with scattering intensities at respective particle sizes based on the particle size distribution as an (average) particle size.

(Preparation of Polymer Cast Film)

A polymer sample was dissolved or dispersed to form a solution or dispersion of 12 wt. %. The resultant liquid was cast in a stainless steel-made vessel and dried at 120° C. for 40 minutes to form a 30 µm-thick film or at 120° C. for 2 hours to form a 200 µm-thick film.

(Storage Modulus)

A 200 µm-thick cast film obtained in the above was subjected to measurement of dynamic viscoelasticity by using a viscoelasticity meter ("VIBRON", made by Toyo Baldwin K.K.) for a temperature range of −100° C. to 100° C. at a frequency of 110 Hz and a temperature-raising rate of 2° C./min., and a storage modulus was determined from the real part of the measured viscoelasticity.

(Tensile Test)

A 30 µm-thick film obtained in the above was cut into a rectangle of 100 mm×5 mm to form a test piece. The test piece was held at a length of 50 mm between chucks and was subjected to measurement of a tensile modulus and a tensile elongation at break by using a tensile tester ("AUTOGRAPH AGS-J", made by K.K. Shimadzu Seisakusho) at a crosshead speed of 100 mm/min.

(Swellability and Gel Fraction)

An electrolytic solution was formed by adding $LiPF_6$ at a concentration of 1 mol/liter into a solution formed by mixing EC (ethylene carbonate)/EMC (ethyl methyl carbonate)/DEC (diethyl carbonate) at weight ratios of 3:5:2, and a 200 µm-thick film obtained in the above was immersed in the electrolytic solution at 60° C. for 7 hours. Then, the film was taken out of the solution, the solution on both surfaces was wiped out and the film was weighed to obtain a weight of the swollen film sample. The sample film was further washed by immersion in DMC (dimethyl carbonate) at room temperature and dried at 120° C. for 2 hours to measure a weight after the drying. A percentage weight increase by swelling of the sample was determined as a swellability, and a weight fraction of the sample insoluble in the electrolytic solution was determined as a gel fraction based on calculation according to the formulae shown below.

Swellability=(Weight of swollen sample−weight of the dry sample after the test)/(weight of the dry sample after the test)×100 (wt. %).

Gel fraction=(weight of the dry sample after the test)/(weight of the sample before the test)×100 (wt. %).

(Preparation of Coated Electrode)

<Positive Electrode>

Respective components giving an electrode composition of:

$LiCoO_2$ 100 parts ("CELLSEED C-10N", made by Nippon Kagaku Kogyo K.K.)

Carbon black 2 parts, and ("DENKA BLACK", made by Denkikagaku Kogyo K.K.)

Binder sample 2 parts were dispersed in solvent NMP to prepare an electrode-forming slurry having a solid matter content of 73 wt. %, which was then onto 15 µm-thick Al foils by a bar coater and dried at 100° C. for 20 min. to obtain a one-surface coated electrode having a coating weight on one surface of 250 g/m² and a both-surface-coated electrode having a coating weight one surface of 500 g/m².

(Negative Electrode)

Respective components giving an electrode composition of:

Artificial graphite 96 parts ("MCMB 25-28", made by Osaka Gas Chemical K.K.), and Binder sample 4 parts were dispersed in solvent NMP to prepare an electrode-forming slurry having a solid matter content of 63 wt. %, which was then applied onto 10 µm-thick Cu foils by a bar coater and dried at 110° C. for 30 min. to prepare a one-surface coated electrode and a both-surface coated electrode each having a coating weight on one surface of 150 g/m².

(Peeling Strength Test)

<Positive Electrode>

A one-surface coated positive electrode having a coating weight of 250 g/m² obtained in the above was cut into a test piece of 100 mm in length and 20 mm in width, and the coated-surface of the test piece and a thick plastic sheet were applied to each other via a both-surface adhesive tape and subjected to a 90-degree peeling test according to JIS K-6854 by using a tensile tester ("STA-1150 UNIVERSAL TESTING MACHINE", made by ORIENTEC K.K.) at a head speed of 10 mm/min., thereby measuring a peeling strength.

<Negative Electrode>

A one-surface coated negative electrode having a coating weight of 150 g/m² obtained in the above was cut into a size of 50 mm in length and 20 mm in width and subjected to a flat press at room temperature to form a test piece having an electrode density of 1.5 g/cm³, and an adhesive gum tape was applied onto the coated-surface of the test piece. The test piece thus treated was subjected to a 180-degree peeling test according to JIS K-6854 by using the Cu foil as a "flexible adhered material" and a tensile tester ("STA-1150 UNIVERSAL TESTING MACHINE", made by ORIENTEC K.K.) at a head speed of 200 mm/min., thereby measuring a peeling strength.

(Electrode Flexure Test)

<Positive Electrode>

A both-surface coated positive electrode having a coating weight on one surface of 500 g/m² obtained in the above was pressed at a linear pressure of 1 t/cm by a roll press having a surface temperature of 130° C., and was cut into a test piece of 100 mm in length and 20 mm in width. The test piece was placed on a 1 mm-thick flat metal sheet, and a 3.5 mm-dia. metal rod was placed thereon in parallel to the metal sheet surface, followed by fixation of both ends of the metal ends by clips. The test piece was then wound about the circumference of the thus-fixed metal rod for ca. 360 degrees to observe how the electrode layers were broken with eyes.

<Negative Electrode>

A both-surface coated negative electrode having a coating weight on one surface of 150 g/m² obtained in the above was pressed at a linear pressure of 1 t/cm by a roll press having a surface temperature of 130° C., and was cut into a test piece of 100 mm in length and 20 mm in width. The test piece was sandwiched between 1 mm-thick flat metal sheets while bending the test piece to compress the test piece, whereby the appearance of breakage of the electrode layer was observed with eyes.

Hereinbelow, Production Examples of various polymers will be described first.

Production Examples of Core/Shell Polymers (A)

Polymers A-1 to A-5 corresponding to examples of the core/shell polymer (A) of the present invention were prepared in the following manner.

(Polymer A-1)

Polymerization of the core: Into an autoclave having an inner volume of 2 liter, 1000 g of deionized water, 4 g of ammonium perfluorooctanoate and 0.8 g of sodium pyrophosphate, were charged, and after 3 times of substitution with nitrogen by pressurization up to 5 MPa, the system was heated to 80° C. Separately, 120 g of vinylidene fluoride (VDF), 80 g of chlorotrifluoroethylene (CTFE), 2 g of perfluorodivinyl ether (CL) represented by a formula of: $CF_2=CFO(CF_2)_2OCF(CF_3)CF_2OCF=CF_2$ and 1 g of ethyl acetate, were respectively weighed and mixed with each other to form 203 g of a monomer mixture. Then, a portion (82 g) of the monomer mixture was added at a time into the above autoclave, and when the inner pressure became 2.6 MPa, 20 g of 1 wt. % aqueous solution of ammonium persulfate was added to effect suspension polymerization. After 1 hour, the inner pressure was lowered to 1.0 MPa, when a first step polymerization was finished. Then, the remainder (121 g) of the monomer mixture was continually added over 2 hours so as to keep an inner pressure of 2.6 MPa. After the addition, then the pressure was lowered to 1.3 MPa, a second step polymerization was judged to be completed and the non-reacted monomer in the autoclave was purged to finish the emulsion polymerization of the core.

Polymerization of the shell: A monomer mixture was prepared in advance by weighing 200 g of vinylidene fluoride, 2 g of perfluorodivinyl ether and 1 g of ethyl acetate into a monomer charge pot. Subsequent to the above-described emulsion polymerization of the core, 20 g of 1 wt. % aqueous solution of ammonium persulfate was added at 80° C., and then the above monomer mixture was continually added so as to keep an inner pressure of 3.2 MPa to effect 6 hours of polymerization. After the monomer addition, when the inner pressure was lowered to 2.7 MPa, the polymerization of the shell was judged to be completed, and after cooling down to 40° C., the residual monomer was purged.

Then, 1000 g of the thus-obtained latex was added dropwise into 1000 g of 0.3 wt. % aqueous solution of calcium chloride under stirring to effect salting out, followed by solid-liquid separation by suction filtration and drying at 30° C. for 12 hours to obtain a core/shell Polymer A-1. Polymer A-1 exhibited a latex particle size of 133 nm.

The outline of the composition and the measured particle size are inclusively shown in Table 1 appearing hereinafter together with the results of the following examples.

(Polymers A-2 to A-6)

Core/shell Polymers A-2 to A-6 were prepared in the same manner as in the above Production Example of Polymer A-1 except for changing the monomer compositions of the core and shell and the core/shell weight ratio, respectively as shown in Table 1 below.

TABLE 1

| Polymer | Core/shell wt: ratio | Compositional ratio of core* | | | Compositional ratio of shell | | Particle size [nm] |
|---|---|---|---|---|---|---|---|
| | | VDF | CTFE | CL | VDF | CL | |
| A-1 | 50/50 | 60 | 40 | 1 | 100 | 1 | 133 |
| A-2 | 70/30 | 80 | 20 | 1 | 100 | 1 | 187 |
| A-3 | 90/10 | 80 | 20 | 1 | 100 | 1 | 156 |
| A-4 | 30/70 | 60 | 40 | 1 | 100 | 1 | 130 |
| A-5 | 50/50 | 80 | 20 | 1 | 100 | 1 | 195 |
| A-6 | 50/50 | 60 | 40 | 1 | 100 | 0 | 137 |

*Abbreviations for monomers are as follows (Common to subsequent Tables 2 to 4.)
VDF: vinylidene fluoride
CTFE: chlorotrifluoroethylene
CL: crosslinking agent: perfluorodivinyl ether
$CF_2=CFO(CF_2)_2OCF(CF_3)CF_2OCF=CF_2$ Production Examples of Crosslinked Vinylidene Fluoride Rubber Copolymers (B)

In order to demonstrate that the use of only the core of the core/shell polymer (A) do not provide the desired properties, Polymers B-1 to B-4 as examples of crosslinked rubber copolymer (B) corresponding to the core alone of the core/shell polymer (A) according to the present invention were prepared in the following manner.

(Polymer B-1)

Into an autoclave having an inner volume of 2 liter, 1000 g of deionized water, 4 g of ammonium perfluorooctanoate and 0.8 g of sodium pyrophosphate, were charged, and after 3 times of substitution with nitrogen at 5 MPa, the system was heated to 80° C. Separately, 320 g of vinylidene fluoride, 80 g of chlorotrifluoroethylene, 4 g of perfluorodivinyl ether and 2 g of ethyl acetate, were respectively weighed and mixed with each other to form 406 g of a monomer mixture in a monomer charge pot. Then, a portion (82 g) of the monomer mixture was added at a time into the above autoclave, and when the inner pressure became 2.8 MPa, 20 g of 1 wt. % aqueous solution of ammonium persulfate was added to effect suspension polymerization. After 1 hour, the inner pressure was lowered to 1.6 MPa, when a first step polymerization was finished. Then, the remainder of the monomer mixture was continually added over 5 hours so as to keep an inner pressure of 2.8 MPa. After the addition, when the pressure was lowered to 1.6 MPa, a second step polymerization was judged to be completed and after cooling down to 40° C., the non-reacted monomer in the autoclave was purged.

Then, 1000 g of the thus-obtained latex (particle size=154 nm) was added dropwise into 1000 g of 0.3 wt. % aqueous solution of calcium chloride under stirring to effect salting out, followed by solid-liquid separation by suction filtration and drying at 30° C. for 12 hours to obtain a crosslinked copolymer, Polymer B-1.

(Polymers B-2 and B-3)

Crosslinked vinylidene fluoride copolymers, Polymers B-2 and B-3, were prepared in the same manner as in the above Production Example of Polymer B-1 except for changing the monomer compositions as shown in Table 2 below.

TABLE 2

| Polymer | VDF | CTFE | CL | Particle size [nm] |
|---------|-----|------|----|--------------------|
| B-1 | 80 | 20 | 1 | 154 |
| B-2 | 60 | 40 | 1 | 164 |
| B-3 | 30 | 70 | 1 | 134 |
| B-4 | 90 | 10 | 1 | 170 |

Production Examples of Vinylidene Fluoride polymers (C)

Polymers C-1 to C-3 as examples of the vinylidene fluoride polymer (C) used as a second (i.e., sub-) binder component of the binder composition of the present invention were prepared in the following manner.

(Polymer C-1)

Into an autoclave having an inner volume of 2 liter, 1030 g of deionized water, 0.25 g of methyl cellulose, 1.5 g of diisopropyl peroxydicarbonate, 400 g of vinylidene fluoride, 3.6 g of ethyl acetate and 0.5 g of sodium pyrophosphate, were changed to effect suspension polymerization at 28° C. After 25 hours, the polymerization was judged to be completed, and the resultant polymer slurry was dewatered, washed with water and dried at 80° C. for 20 hours to obtain a powdery polymer. The polymerization yield was 86 wt. %, and the thus-obtained polymer exhibited an inherent viscosity ($\eta i$) of 1.3 dl/g.

(Polymer C-2)

Polymerization was performed in the same manner as in the case of Polymer C-1 except for using 384 g of vinylidene fluoride and 16 g of chlorotrifluoroethylene instead of the 400 g of vinylidene fluoride. After 22 hours, the polymerization was judged to be completed, and the resultant polymer slurry was dewatered, washed with water and dried at 80° C. for 20 hours to obtain a powdery polymer. The polymerization yield was 92 wt. %, and the thus-obtained polymer exhibited an inherent viscosity ($\eta i$) of 1.3 dl/g.

(Polymer C-3)

Polymerization was performed in the same manner as in the case of Polymer C-1 except for using 384 g of vinylidene fluoride and 16 g of chlorotrifluoroethylene instead of the 400 g of vinylidene fluoride and changing the amount of ethyl acetate from 3.6 g to 3.2 g. After 23 hours, the polymerization was judged to be completed, and the resultant polymer slurry was dewatered, washed with water and dried at 80° C. for 20 hours to obtain a powdery polymer. The polymerization yield was 91 wt. %, and the thus-obtained polymer exhibited an inherent viscosity ($\eta i$) of 2.1 dl/g.

The monomer compositions and inherent viscosities ($\eta i$) of Polymers C-1 to C-3 obtained above are inclusively shown in Table 3 below

TABLE 3

| Polymer | VDF | CTFE | $\eta i$ (dl/g]) |
|---------|-----|------|------------------|
| C-1 | 100 | 0 | 1.3 |
| C-2 | 96 | 4 | 1.3 |
| C-3 | 96 | 4 | 2.1 |

Production and Evaluation Examples of Binder Compositions and Electrodes

The above-obtained Polymers A-1 to A-6 (core/shell polymers of the present invention), Polymers B-1 to B-4 (crosslinked vinylidene fluoride copolymers corresponding to the core alone of the core/shell polymer) and Polymers C-1 to C-3 (vinylidene fluoride polymers used as a sub-binder component in the binder composition of the present invention) were used singly or in combination as binders or binder compositions in the manner as shown in the next Table 4 (in which Example 7 and Comparative Example 11 are negative electrode preparation examples and the other are positive electrode preparation examples) and evaluated with respect to binder properties (storage modulus, tensile modulus, swellability and gel fraction) and electrode performances. The results are inclusively shown in the next Table 4.

TABLE 4

| | Main binder | | | | | | | | | Sub-binder | | | | |
|---|---|---|---|---|---|---|---|---|---|---|---|---|---|---|
| | | | Core composition | | | Shell composition | | Particle size | Core storage modulus | | Composition | | | Storage modulus |
| Example | Name | Core/shell wt. ratio | VDF | CTFE | CL | VDF | CL | [nm] | [MPa] | Name | VDF | CTFE | $\eta i$ [dl/g] | [MPa] |
| 1 | A-1 | 50/50 | 60 | 40 | 1 | 100 | 1 | 133 | 4 | — | — | — | — | — |
| 2 | A-1 | 50/50 | 60 | 40 | 1 | 100 | 1 | 133 | 4 | C-1 | 100 | 0 | 1.3 | 1740 |
| 3 | A-2 | 70/30 | 80 | 20 | 1 | 100 | 1 | 187 | 111 | C-1 | 100 | 0 | 1.3 | 1740 |
| 4 | A-3 | 90/10 | 80 | 20 | 1 | 100 | 1 | 156 | 111 | C-1 | 100 | 0 | 1.3 | 1740 |
| 5 | A-4 | 30/70 | 60 | 40 | 1 | 100 | 1 | 130 | 4 | — | — | — | — | — |
| 6 | A-5 | 50/50 | 80 | 20 | 1 | 100 | 1 | 195 | 111 | — | — | — | — | — |
| Comp. 1 | — | — | — | — | — | — | — | — | — | C-1 | 100 | 0 | 1.3 | 1740 |
| Comp. 2 | — | — | — | — | — | — | — | — | — | C-2 | 96 | 4 | 1.3 | 944 |
| Comp. 3 | — | — | — | — | — | — | — | — | — | C-3 | 96 | 4 | 2.1 | 1094 |
| Ref. 1 | A-2 | 70/30 | 80 | 20 | 1 | 100 | 1 | 187 | 111 | C-1 | 100 | 0 | 1.3 | 1740 |
| Ref. 2 | A-3 | 90/10 | 80 | 20 | 1 | 100 | 1 | 156 | 111 | C-1 | 100 | 0 | 1.3 | 1740 |
| Comp. 4 | B-1 | 100/0 | 80 | 20 | 1 | — | — | 154 | 111 | C-1 | 100 | 0 | 1.3 | 1740 |
| Comp. 5 | B-2 | 100/0 | 60 | 40 | 1 | — | — | 164 | 4 | C-1 | 100 | 0 | 1.3 | 1740 |
| Comp. 6 | B-3 | 100/0 | 30 | 70 | 1 | — | — | 134 | 200 | C-1 | 100 | 0 | 1.3 | 1740 |
| Ref. 3 | A-2 | 70/30 | 80 | 20 | 1 | 100 | 1 | 187 | 111 | — | — | — | — | — |
| Ref. 4 | A-3 | 90/10 | 80 | 20 | 1 | 100 | 1 | 156 | 111 | — | — | — | — | — |
| Comp. 7 | B-1 | 100/0 | 80 | 20 | 1 | — | — | 154 | 111 | — | — | — | — | — |
| Comp. 8 | B-2 | 100/0 | 60 | 40 | 1 | — | — | 164 | 4 | — | — | — | — | — |
| Comp. 9 | B-3 | 100/0 | 30 | 70 | 1 | — | — | 134 | 200 | — | — | — | — | — |

TABLE 4-continued

| | | | | | | | | | | | | | | |
|---|---|---|---|---|---|---|---|---|---|---|---|---|---|---|
| Comp. 10 | B-4 | 100/0 | 90 | 10 | 1 | — | — | 170 | 420 | — | — | — | — | — |
| 7 *2 | A-6 | 50/50 | 60 | 40 | 1 | — | — | 137 | 4 | — | — | — | — | — |
| Comp. 11 *2 | — | — | — | — | — | — | — | — | — | C-1 | 100 | 0 | 1.3 | 1740 |

| | | Total binder | | | Electrode | |
|---|---|---|---|---|---|---|
| Example | Main/sub binder ratio | Tensile modulus [MPa] | Swellability wt. % | Gel fraction wt. % | Peeling strength (gf/10 mm) | Electrode state *1 |
| 1 | 100/0 | 310 | 38 | 99 | 4.2 | ○ |
| 2 | 75/25 | 737 | 29 | 99 | 4.5 | ○ |
| 3 | 50/50 | 845 | 33 | 100 | 3.2 | ○ |
| 4 | 50/50 | 769 | 46 | 97 | 3.2 | ○ |
| 5 | 100/0 | 822 | 32 | 100 | 4.5 | ○ |
| 6 | 100/0 | 395 | 41 | 98 | 3.5 | ○ |
| Comp. 1 | 0/100 | 2016 | 18 | 100 | 7.3 | X |
| Comp. 2 | 0/100 | 1327 | 22 | 100 | 3.3 | X |
| Comp. 3 | 0/100 | 1141 | 24 | 98 | 8.0 | X |
| Ref. 1 | 25/75 | 1326 | 23 | 100 | 3.9 | X |
| Ref. 2 | 25/75 | 1329 | 22 | 100 | 3.8 | X |
| Comp. 4 | 50/50 | 652 | 29 | 78 | 3.5 | — |
| Comp. 5 | 50/50 | 580 | 41 | 71 | 2.2 | — |
| Comp. 6 | 50/50 | 516 | 18 | 84 | 3.1 | — |
| Ref. 3 | 100/0 | 181 | Dispersed | 0 | 2.4 | — |
| Ref. 4 | 100/0 | 107 | Dispersed | 0 | 2.7 | — |
| Comp. 7 | 100/0 | Unmeasurable | Dispersed | 0 | 2.8 | — |
| Comp. 8 | 100/0 | Unmeasurable | Dispersed | 0 | 1.5 | — |
| Comp. 9 | 100/0 | Unmeasurable | Dispersed | 0 | Unmeasurable | — |
| Comp. 10 | 100/0 | 552 | Dispersed | 0 | Unmeasurable | — |
| 7 *2 | 100/0 | 285 | 40 | 99 | 69 | ○ |
| Comp. 11 *2 | 0/100 | 2016 | 18 | 100 | 21 | X |

*1: Electrode state after winding ○: No electrode breakage, X: Electroductive substrate, broken. —: Not measured
*2: Negative electrodes were prepared in only Example 7 and Comparative Example 11. Positive electrodes were prepared in the other examples.

Referring to Table 4, the respective examples are summarized as follows.

Examples 1, 5 and 6

Polymers A-1, A-4 and A-5 (corresponding to examples of the core/shell polymer (A) of the present invention) were respectively used singly as binders.

Examples 2-4

Polymers A-1, A-2 and A-3 (corresponding to examples of the core/shell polymer (A) of the present invention) were blended with Polymer C-1 (vinylidene fluoride polymer as a sub-binder component) in weight ratios of 75/25, 50/50 and 50/50, respectively, to form binder compositions.

The binders of the above Examples 1-6
All exhibited satisfactory results with respect to all the evaluation items.

Comparative Examples 1-3

The vinylidene fluoride Polymers C-1 to C-3 used as sub-binder components in the binder composition of the present invention were respectively used singly as binders in these examples: In these examples, composite electrode layers having extremely high storage moduli and tensile moduli and accordingly lacking flexibility were formed so that breakage of the electroconductive substrates were caused in the electrodes after winding.

Reference Examples 1-4

Polymers A-2 and A-3 corresponding to examples of the core/shell polymer (A) of the present invention but having a core/shell polymer ratio exceeding 50/50, when used singly as binders, provided films which were eroded by a nonaqueous electrolytic solution at 60° C. and dispersed to lose their integrity as films (Reference Examples 3 and 4). However, these polymers, when combined with an appropriate ratio of vinylidene fluoride Polymer C-1, provided films which exhibited an appropriately low swellability, an appropriately high gel fraction, and excellent resistance to the nonaqueous electrolytic solution and flexibility (Examples 3 and 4). However, when the amount of the vinylidene fluoride Polymer C-1 was excessive, the resultant films were provided with inferior flexibility to cause breakage of the electrodes (Reference Examples 1 and 2).

Comparative Examples 4-10

Polymers B-1 to B-4 corresponding to the core alone of the core/shell polymer (A) of the present invention, when used singly as binders, exhibited insufficient resistance to the non-aqueous electrolytic solution (i.e., failing to retain integrity as films in the measurement of swellability and further exhibited low electrode peeling strength (Comparative Examples 7-10). Further, when used as sub-binders to be combined with vinylidene fluoride Polymer C-1, the resultant compositions failed to exhibit a sufficient improvement in resistance to nonaqueous electrolytic solution (i.e., exhibiting a low gel fraction, Comparative Examples 4-6).

Example 7

In order to confirm the adaptability as a binder for negative electrodes, core/shell Polymer (A-6) was used singly as a binder to form a negative electrode according to the method described before. The electrode subjected to the electrode flexure test showed a density of 1.78 g/cm³. As shown in Table 4, regardless of a higher density than in Comparative Example 11 described below, no breakage of electrode occurred in the electrode flexure test.

Comparative Example 11

Polymer (C-1) was used singly as a binder for formation of a negative electrode. The electrode subjected to the electrode flexure test showed a density of 1.71 g/cm$^3$. As shown in Table 4, the electrode caused a breakage (a breakage of the electroconductive substrate).

INDUSTRIAL APPLICABILITY

As described above, the present invention provides: a vinylidene fluoride-based core/shell polymer which is excellent in mechanical properties including flexibility and resistance to nonaqueous electrolytic solutions, is capable of forming a composite electrode layer showing excellent flexibility and adhesion to an electroconductive substrate in combination with a powder active substance, and is therefore suitable for use as a binder for nonaqueous electrochemical devices; and also a binder composition for nonaqueous electrochemical devices, an electrode-forming composition, an electrode and a nonaqueous electrochemical device containing the above core/shell polymer.

The invention claimed is:

1. A core/shell polymer (A), comprising: a rubbery core comprising a crosslinked vinylidene fluoride copolymer (a) having a vinylidene fluoride content of 30-90 wt. %, and a shell comprising a vinylidene fluoride polymer (b) having a vinylidene fluoride content which is larger than in the crosslinked vinylidene fluoride copolymer (a) and at least 80 wt. %, in a weight ratio (a)/(b) of 30/70-90/10.

2. A core/shell polymer (A) according to claim 1, wherein the crosslinked vinylidene fluoride copolymer (a) has a storage modulus of at most 500 MPa at room temperature.

3. A core/shell polymer (A) according to claim 1, which has been produced through emulsion polymerization.

4. A core/shell polymer (A) according to claim 1, wherein the crosslinked vinylidene fluoride copolymer (a) has been crosslinked with a fluorine-containing monomer having at least two double bonds.

5. A core/shell polymer (A) according to claim 1, wherein the vinylidene fluoride polymer (b) has been crosslinked with a fluorine-containing monomer having at least two double bonds.

* * * * *